United States Patent Office 3,514,514
Patented May 26, 1970

3,514,514
17α-ETHINYL-18-METHYL-19-NORTESTOS-
TERONE ESTERS
Hans-Günter Lehmann, Heinz Gibian, Rudolf Weichert, and Friedmund Neumann, Berlin, Germany, assignors to Schering Aktiengesellschaft, Berlin, Germany
No Drawing. Filed May 4, 1966, Ser. No. 547,438
Claims priority, application Germany, May 5, 1965, Sch 37,001
Int. Cl. A61k 17/06
U.S. Cl. 424—238    8 Claims This invention relates to 17β-monoesters and 3-enol-17β-diesters of 17α-ethinyl-18-methyl-19-nortestosterone esters. More particularly, this invention is concerned with an improved method for preparing and securing them.

In accordance with the present invention, there are provided 17β-monoesters and 3-enol-17β-diesters of 17α-ethinyl-18-methyl-19-nortestosterone constituting new therapeutic compounds having outstanding properties. These compounds possess progestive activity and are active when administered orally or subcutaneously. They are readily soluble in the conventional pharmaceutical carriers used for steroid hormones as, for example, vegetable oils such as sesame oil, castor oil, cotton seed oil, sunflower oil, olive oil, and the like, as well as in synthetic solvents, for instance, glycols, lactic acid esters, benzyl benzoate and the like. Because of their considerable solubility, it is possible to employ solutions of the esters of the invention as injectibles and thereby also to utilize them as hormone depots.

The active compounds of the invention are prepared by reacting 17α-ethinyl-18-methyl-19-nortestosterone with an organic carboxylic acid or reactive derivative thereof in the conventional manner to produce the ester. The 3-enol ester group of the primarily formed 3-enol-17β-diester is thereafter under regeneration of the 3-keto-$\Delta^4$-group partially saponified.

The new esters demonstrate central inhibiting activity and are accordingly suitable as highly effective ovulation inhibiting agents.

The ovulation inhibiting activity was demonstrated in normal female rats (Sprague-Dawley) where following oral administration the conventional tube inspection tests were carried out and established for 17α-ethinyl-18-methyl-19-nortestosterone-acetate a $ED_{50}$ of only 3 mg. In comparison, the free 17α-ethinyl-18-methyl-19-nortestosterone had a $ED_{50}$ of 10 mg. (the $ED_{50}$ is that dosage which results in inhibition of ovulation in 50% of the experimental animals). Side effects such as weight gain, liver incompatibility or estrogen side reactions were not observed.

The new compounds accordingly are indicated as therapeutic agents for medical conditions where inducing a quiet state in the ovaries is recommended.

As further applications, the compounds can be used, for example, in the treatment of dysmenorrhea, endometriosis, cyclic disturbances, and functional sterility.

The compounds of the invention are administered in the conventional dosage forms, such as capsules, granulates, solutions, dragées, and tablets and are compounded together with suitable pharmaceutical carriers. When tablets are prepared they may be made in various sizes (total weight of 50–150 mg.) containing from about 0.1–0.5 mg. of the drug suitably in combination with another hormone component having estrogenic activity as, for instance, 0.05 mg. ethinyl estradiol. The tablets are generally compounded with binding agents, lubricants and other substances which are commonly used in tablet manufacture such as magnesium stearate, stearic acid, talc, corn starch, lactone or the like. If desired, these tablets may be coated with sugar or shellac preparations in accordance with the common practices in the tablet manufacturing art.

In addition, the higher esters are characterized by an excellent and protracted activity.

The active compounds can be prepared by the conventional methods of steroid chemistry.

The esterification with the desired acid can be conducted in an acid or an alkaline reaction medium. As a result of the acid esterification, there is directly produced the 17-mono-ester. There must, however, be accepted a higher loss of desired product as simultaneously with the esterification an aromatization of the A-ring takes place. The undesired side reaction can be avoided through the intermediate protection of the 3-keto group, for instance, by ketalization. This procedure implies two steps in the formation of the 17-mono-ester, i.e., ketal formation and ketal splitting.

An alternate reaction is the alkaline esterification effected in the presence of an organic nitrogen base, as for instance pyridine, quinoline, etc., whereby there is produced as the primary product a 3-enol-17β-diacyl ester. The reaction mixture containing the primary product is further worked up, for example, by treatment with neutral ice water or extraction, or through prolonged stirring in alkaline ice water and the resulting 17-mono-acyl-ester isolated.

For use in the esterification, any of the acids suitable in steroid chemistry can be used. Illustrative of suitable acids are aliphatic carboxylic acids having 1–11, and most preferably 1–8, carbon atoms in the acid group, for example, acetic acid, propionic acid, caproic acid, onanthic acid, undecylic acid. The acids can be saturated or unsaturated, branched or not, polybasic or substituted in the known manner such as trimethylacetic, t.butylacetic, phenylacetic, cyclopentyl-propionic, halogen-acetic, aminoacetic, oxypropionic, benzoic, succinic, adipic acids, etc. The esterification is advantageously carried out at elevated temperatures, preferably at temperatures of from 130–200° C. The time required for the reaction is directly dependent on the reaction temperature. Thus the diester is produced after 6 hours with a reaction temperature of 160° C. and in 5 hours with a reaction temperature of 170° C. The said diester, i.e., 3-enol-17β-diacyl ester is thereafter partially saponified in the 3-position.

The following examples are given in order to disclose more clearly the nature of the present invention. It should be understood, however, that the examples are not intended to be a limitation on the scope of the invention.

EXAMPLE 1

A solution of 2 g. 17α-ethinyl-18-methyl-19-nor-testosterone in 26 ml. pyridine was reacted with 13 ml. acetanhydride and the reaction mixture heated to 160° C. in a bomb tube. The reaction mixture was then cooled and the cooled mixture poured into ice water. The precipitate which was produced was filtered off, washed with water until neutral and following drying chromatographed using silica gel. There were recovered 1.2 g. crude 17α-ethinyl-18-methyl-$\Delta^{3,5}$-estradiene-3, 17β-diol-ditcetate, which following recrystallization from ether melted at 156–159° C. The yield amounted to 840 mg.

EXAMPLE 2

400 mg. 17α-ethinyl-18-$\Delta^{3,5}$-estradiene-3,17β-diol-diacetate were admixed with 400 mg. sodium bicarbonate in 40 ml. methanol and 4 ml. water and the mixture stirred at room temperature for 6 hours. Thereafter, the reaction mixture was poured into ice water and neutralized with glacial acetic acid. The precipitate which formed was separated off by filtration, washed with water and dried. There were thereby produced 350 mg. crude 17α-ethinyl-18-methyl-19-nortestosterone acetate having a melting point of 156–157° C. Following recrystallization from ether, 260 mg. of the acetate melting at 162–163° C. were obtained.

EXAMPLE 3

A solution of 400 mg. 17α-ethinyl-18-methyl-Δ³,⁵-estradiene-3, 17β-diol-diacetate in 40 ml. methanol and 4 ml. water were refluxed in the presence of 4 ml. 37% HCl for 5 minutes. The reaction mixture was then poured into water and worked up according to the procedure of Example 2. There were recovered 355 mg. crude 17α-ethinyl-18-methyl-19-nortestosterone-acetate having a melting point of 157° C. After recrystallization from ether, there were obtained 256 mg. pure 17β-acetate which had a melting point of 163° C. and is identical with the material of Example 2.

EXAMPLE 4

2 g. 17β-ethinyl-18-methyl-19-nortestosterone in 26 ml. pyridine and 27 g. caproic acid anhydride were heated together under a nitrogen atmosphere for 7 hours at 160° C. Following cooling, the reaction mixture which contained the primary formed 17α-ethinyl-18-methyl-19-nortestosterone-3-enol-17β-dicapronate was poured into bicarbonate water and stirred for 30 hours to saponify the excess caproic acid anhydride. Following filtration, there were obtained 2.1 g. of an oily crude product. The crude product was purified chromatographically using silica gel and resulted in the recovery of 1.6 g. 17α-ethinyl-18-methyl-19-nor-testosterone-caproate having a melting point of 112–113° C. After dissolution in pentane, there were recovered 1.5 g. of the caproate having an unchanged melting point.

In place of the nitrogen there can be used other inert protective gases as, for instance, argon.

What is claimed is as follows:

1. A therapeutic compound for inhibiting ovulation comprising as active ingredient a compound selected from the group consisting of a 17-ester of 17α-ethinyl-18-methyl-19-nor-testosterone and a 17α-ethinyl-18-methyl-Δ³,⁵-estradiene-3,17β-diol-3,17β-diester, wherein the said 17-ester and 3,17β-diester groups are formed from aliphatic carboxylic acids having from 1 to 11 carbon atoms in the ester residue; and a pharmaceutical carrier for said compound.

2. The compound of claim 1 which is the 17β-acetate of the said nortestosterone.

3. The compound of claim 1 which is the 17β-caproate of the said nortestosterone.

4. The compound of claim 1 which is the 17β-diacetate of the said estradiene.

5. The compound of claim 1 which is the 17β-caproate of the said estradiene.

6. A therapeutic composition for inhibiting ovulation comprising as active ingredient the 17α-ethinyl-18-methyl-19-nortestosterone ester defined in claim 1 in an amount of 0.1 to 0.5 mg. and in admixture with a pharmaceutical carrier.

7. A therapeutic composition for inhibiting ovulation according to claim 6, wherein said ester is 17α-ethinyl-18-methyl-19-nortestosterone-acetate.

8. A method of providing steroid therapy which comprises administering to a subject a therapeutic composition according to claim 6.

References Cited
UNITED STATES PATENTS

| | | | |
|---|---|---|---|
| 2,601,287 | 6/1952 | Heyl et al. | 260—397.3 |
| 2,798,879 | 7/1957 | Donia et al. | 260—397.4 |
| 2,868,809 | 1/1959 | Donia et al. | 260—397.4 |
| 3,006,933 | 10/1961 | Allen et al. | 260—397.45 |
| 3,231,589 | 1/1966 | Greenspan et al. | 260—397.4 |

HENRY A. FRENCH, Primary Examiner

U.S. Cl. X.R.

260—239.55, 397.4, 397.5; 424—243